Patented Oct. 22, 1929

1,732,533

UNITED STATES PATENT OFFICE

LAWRENCE V. REDMAN, OF CALDWELL, NEW JERSEY, ASSIGNOR TO BAKELITE CORPORATION, OF NEW YORK, N. Y., A CORPORATION OF DELAWARE

MOLDING MIXTURE

No Drawing.   Application filed November 9, 1926.   Serial No. 147,384.

This invention is a novel molding mixture prepared by reacting urea and formaldehyde or their equivalents in presence of filling materials including proteid bodies of the type of casein.

It is well known that urea and formaldehyde are capable of reacting to yield clear resinous products which become infusible when sufficiently heated; but the resins thus prepared do not function satisfactorily as binders for the usual fibrous or other fillers which are commonly used in conjunction with reactive resins of the phenol-aldehyde type. I have discovered however that these urea-formaldehyde resins form excellent molding mixtures when properly associated or combined with fillers consisting wholly or in sufficient proportion of such proteid bodies as casein, gelatin, glue or the like. I prefer to use casein, and in conjunction therewith certain plasticizing agents of which ethylene glycol and glycerin are types. In its preferred embodiment the invention is carried out as described below, it being understood however that it is not limited to the particular materials, proportions or manipulations there given by way of illustration and example.

A mixture is prepared comprising by weight:

|  | Parts |
|---|---|
| Casein | 100 |
| Urea | 100 |
| Paraform | 100 |
| Water | 50 |
| Ethylene glycol | 40 |
| Aqueous ammonia | 13 |

These ingredients are thoroughly commingled in suitable mechanical mixing devices, for example in a ball mill followed by sheeting on differential rolls. The resin-forming reaction takes place largely under the sheeting rolls, at which point also the volatile components including the water introduced with the reagents, as well as that resulting from the reaction of urea and formaldehyde, is largely driven off, resulting in a nearly anhydrous and thoroughly homogeneous mixture of the casein, the urea resin and the glycol.

The above formula may of course be modified both with respect to the specific ingredients and their proportions, to meet particular molding requirements. It comprises three classes of components, all of which are essential for the best results, to wit: the urea and formaldehyde (or paraform) or their equivalents which are of course the resin-forming ingredients; the casein or equivalent proteid which is the principal filler; and the glycol, ammonia and water which serve to plasticize the filler. It will be understood that inert fillers, such as wood fiber, lithopone or the like, may be used in conjunction with the proteid to an extent not objectionably reducing the plasticity of the mixture, the amount depending on the specific application.

Thus the proportions of urea and formaldehyde or their equivalents may be greatly reduced, provided of course the proper function of the binding resin is not impaired: for example the urea and formaldehyde may be used in the proportion of 10 parts by weight of each or even somewhat less to 100 parts of the proteid, or any intermediate proportion of these components may be employed, according to the particular qualities required in the product.

The molding mixture prepared as above has good molding qualities and under standard hot-press molding conditions yields hard and strong molded articles which are infusible and but litle affected by neutral solvents. In some cases I prefer to incorporate with the mixture cellulose esters, especially the acetate or the di-nitro compound, the effect of which is to improve the surface appearance and water-resistance of the molded product, without injuring the molding quality of the mixture. Similarly I may improve the working qualities of the mixture for specific applications by the addition of other plasticizers, especially such as combine a low vapor pressure with a water-repellant character, like the di-alkyl esters of organic acids, such for example as the di-ethyl or di-butyl oxalates, tartrates or phthalates. These and other additions may be made without departing from my invention.

Instead of urea I may use thiourea or in general such homologs or derivatives of urea as are equivalent thereto for the purposes of this invention, and the term urea is used herein to include such equivalents.

I claim:

1. A molding mixture comprising a substantially anhydrous mixture including a resin of the urea-formaldehyde type and a proteid filling material.

2. A molding mixture comprising a substantially anhydrous mixture including a resin of the urea-formaldehyde type, and casein.

3. A molding mixture comprising a substantially anhydrous mixture including a resin of the urea-formaldehyde type, a proteid filling material, and a placticizing agent for said filling material.

4. A molding mixture comprising a substantially anhydrous mixture including a resin of the urea-formaldehyde type, casein, and a plasticizing agent for the casein.

5. A molding mixture comprising a substantially anhydrous mixture including a resin of the urea-formaldehyde type, casein, and glycol.

In testimony whereof, I affix my signature.

LAWRENCE V. REDMAN.